United States Patent
Gibeault

(10) Patent No.: US 8,772,362 B1
(45) Date of Patent: Jul. 8, 2014

(54) EXPANDED POLYSTYRENE MADE USING D-LIMONENE AS A PLASTICIZER

(71) Applicant: Jean-Pierre Gibeault, Waterloo (CA)

(72) Inventor: Jean-Pierre Gibeault, Waterloo (CA)

(73) Assignee: Nexkemia Petrochimie Inc., Masonville QC (CA)

( * ) Notice: Subject to any disclaimer, the term of this patent is extended or adjusted under 35 U.S.C. 154(b) by 0 days.

(21) Appl. No.: 14/102,731

(22) Filed: Dec. 11, 2013

Related U.S. Application Data

(60) Provisional application No. 61/765,387, filed on Feb. 15, 2013.

(51) Int. Cl.
*C08J 9/16* (2006.01)
*C08J 9/20* (2006.01)

(52) U.S. Cl.
CPC .... *C08J 9/20* (2013.01); *C08J 9/16* (2013.01); *C08J 2325/06* (2013.01); *C08J 2325/04* (2013.01); *C08J 2203/14* (2013.01); *C08J 2201/034* (2013.01)
USPC .............................................. 521/56; 521/60

(58) Field of Classification Search
CPC ............ C08J 9/16; C08J 9/20; C08J 2325/06; C08J 2325/04; C08J 2203/14; C08J 2201/034
See application file for complete search history.

(56) References Cited

U.S. PATENT DOCUMENTS

| | | |
|---|---|---|
| 3,959,189 A * | 5/1976 | Kitamori ......................... 521/59 |
| 7,122,250 B2 | 10/2006 | Kinsho et al. |
| 8,084,510 B2 | 12/2011 | Morioka et al. |
| 8,168,722 B2 | 5/2012 | Krupinski et al. |
| 8,329,294 B2 * | 12/2012 | Ishida et al. ................... 428/402 |
| 2004/0152795 A1 * | 8/2004 | Arch et al. ....................... 521/56 |
| 2007/0015852 A1 | 1/2007 | Akutagawa et al. |
| 2009/0011667 A1 | 1/2009 | Hayward et al. |
| 2010/0209689 A1 | 8/2010 | Shima et al. |
| 2012/0214885 A1 | 8/2012 | Tarumoto et al. |

\* cited by examiner

*Primary Examiner* — Kara Boyle
(74) *Attorney, Agent, or Firm* — Eric Mirabel

(57) ABSTRACT

Disclosed is a process for production of expanded polystyrene using D-limonene as a plasticizer, which allows reducing the amount of pentane in the process, yet allows generating beads with similar cell size as if greater quantities of pentane had been used. Pentane is an organic solvent with toxicity associated with organic solvents.

11 Claims, No Drawings

EXPANDED POLYSTYRENE MADE USING D-LIMONENE AS A PLASTICIZER

BACKGROUND

Expanded polystyrene (EPS) is a rigid and tough, closed-cell foam. It is usually white and made of pre-expanded polystyrene beads. EPS is used for disposable trays, plates, bowls and cups; and for carry-out food packaging and refrigerant containers, as it has good insulating properties. Other uses include molded sheets for building insulation and roofing materials, and packing material ("peanuts") for cushioning fragile items inside boxes. Sheets are commonly packaged as rigid panels (generally sized as 4 by 8 or 2 by 8 feet in the United States), which are also known as "bead-boards."

There are two basic processes of polymerizing EPS. Suspension polymerization involves use of a blowing agent (typically pentane) which is used to generate the cells which enhance the insulating properties. But pentane is undesirable for the environment, because, like other organic solvents, exposure to it is associated with toxicity to the nervous system, reproductive damage, liver and kidney damage, respiratory impairment, cancer, and dermatitis.

A polymerization process which reduces the amount of pentane required to generate a product with desired insulating properties is desirable to reduce the exposure of workers to it, and to reduce the release of pentane into the environment.

SUMMARY

EPS is made in a suspension polymerization process as follows.

Styrene liquid is mixed in kettle with demineralised water, a peroxide (which is preferably dibenzoyl peroxide, hydrogen peroxide 2,5-dimethyl-2,5-di(2-ethylhexanoylperoxy)hexane, or hydrogen peroxide) a nucleating agent (like a paraffin wax) and optionally, flame retardant chemicals (which are preferably brominated compounds, including decabromodiphenyl oxide, phenoxy tetrabromnobisphenol A, tetrabromobisphenol A bis(allyl ether, hexabromocyclododecane, and brominated polymer)), included if desired for the final product. D-limonene is also added to act as a plasticizer. A primary suspending agent, preferably tricalcium phosphate (TCP) in the form of fine particles, is used to control the bead size. Generally, one also uses an extender (preferably dodecylbenzenesulfonate or another persulfate salt, e.g., ammonium or potassium persulfate) to enhance the suspending agent particles suspension of the polymerizing styrene droplets in the water. Another type of soap surfactant, or a suspension agent (molecular colloids, such as polyvinyl alcohol (PVA) and polyvinylpyrrolidone (PVP), in combination with inorganic alkali metal salts, such as $Mg_2P_2O_7$ and $Ca_3(PO_4)_2$ (so-called Pickering salts) or, other alkali metal salts including sulfates, chlorides, carbonates or hydrogencarbonates), can be used as the extender to activate the TCP.

Polymerization takes place in two stages, and during the first stage the mixture is heated to about 88° C. and the first free-radical polymerization initiator, for example dibenzoyl peroxide, radicalizes (or polymerizes) to bring the styrene polymerization to about 80% of completion. Thereafter, with heating to about 118° C., the second polymerization initiator already added is completing the polymerization: i.e., tert-butyl perbenzoate, tert-butyl peroxy-2-ethylhexanoate, t-butyl ethylhexylmonoperoxycarbonate or t-amyl ethylhexylmonoperoxycarbonate. Prior to the second temperature step up, the pentane (between 3 to 8% by wt) is also added as a blowing agent in the final product, to control the cell size. The nucleating agent (preferably paraffin) is used to help control cell structure, i.e., uniformity and size. The cell sizes and uniformity control the insulation properties of the final product.

It was found that using D-limonene as the plasticizer during the first stage of polymerization allowed use of less pentane, to produce beads with cells of the same size as when no limonene but more pentane is used.

To form commercially useful products, the beads of polystyrene are heated to melt them, preferably with steam. This allows release of the blowing agent and beads expand as a result. The expanded beads can then be placed into a mold, and the heating step can be repeated to fuse the beads inside the mold. These last two steps can be performed by the customer, who can use their own molds to form articles they desire from the beads. Customers can specify bead sizes and cell sizes (thermal resistance) in the beads they order. Larger bead sizes are preferred for use in molds to produce larger panels and objects (e.g., pre-fabricated walls for the construction industry). Smaller bead sizes can be formed into insulating panels for portable insulating products (coolers) or roofing tiles.

DETAILED DESCRIPTION

Following making the beads generated by the processes in the summary, they are formed into sheets for commercial use. The party making sheets may be different from the party making the beads. That is, contractors purchase beads with desired properties to form into sheets, with desired properties.

In one commercial use, the sheets are used in pre-manufactured insulation walls. One type of insulation wall has sheets which hook together (using a transverse insert between the sheets, or using studs running along one dimension between the sheets) to form two sheets in parallel. Cement can be poured into the space between the sheets, to form a cement wall with enhanced insulation properties. The sheets can be pre-formed and taken to the site, where the cement is poured in between.

In other commercial uses, beads with high thermal resistance (formed as described above in Example I) are used to form the walls of a cooler (refrigerant container). The light weight and good insulating properties of EPS make it well suited for use in containing refrigerant and blood, tissues or other biological products.

Use of D-limonene allows control of the cell size in the beads with less pentane, allowing beads to be formed having desirable properties for any of a number of commercial uses. The bead sizes and cell sizes can be controlled in a manner well known to those skilled in the art using the processes described herein.

Example I

Using the following ingredients in the following amounts and following the procedure outlined above, we generated beads with the following sizes and properties.

1 liter of demineralized water and 1 liter of styrene
3.5 grams of dibenzoyl peroxide
0.5 grams of paraffin
6.5 grams of a flame retardant
2.0 grams of limonene
2.0 grams of TCP
0.01 grams of dodecylbenzenesulfonate
1.5 grams of second initiator (tert-butyl perbenzoate)
50 grams of pentane The temperature of the first polymerization was 88° C. and the second polymerization was at 118° C.

This formulation generated beads of 1.0 mm diameter, on average, with an average cell size of about 60-70 microns. Compared to a similar process without limonene, the cell size would be about 30-50 microns with the other ingredients and steps held the same as in Example I. One would need to increase pentane by about 25% by weight to get beads with similar cell sizes (60-70 microns), if D-limonene was not used as the plasticizer. These beads have insulating properties to make them suitable for use in as insulating materials in construction, for refrigeration and shipping containers, and for other applications.

Example II

Using the following ingredients in the following amounts and following the procedure outlined above, EPS beads were generated.
  1 liter of deminerlized water and 1 liter of styrene
  3.5 grams of dibenzoyl peroxide
  0.5 grams of paraffin
  1.0 grams of limonene
  2.0 grams of TCP
  0.01 grams of dodecylbenzenesulfonate
  1.5 grams of second initiator (tert-butyl perbenzoate)
  50 grams of pentane Example III Using the following ingredients in the following amounts and following the procedure outlined above, EPS beads were generated.
  1 liter of deminerlized water and 1 liter of styrene
  3.5 grams of dibenzoyl peroxide
  1.0 grams of paraffin
  1.0 grams of limonene
  2.0 grams of TCP
  0.01 grams of dodecylbenzenesulfonate
  1.5 grams of second initiator (tert-butyl perbenzoate)
  50 grams of pentane The specific methods, processes and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, any of the terms "comprising", "including", "containing", etc. are to be read expansively and without limitation. The methods and processes illustratively described herein suitably may be practiced in differing orders of steps, and that they are not necessarily restricted to the orders of steps indicated herein or in the claims. It is also noted that as used herein and in the appended claims, the singular forms "a," "an," and "the" include plural reference, and the plural include singular forms, unless the context clearly dictates otherwise. Under no circumstances may the patent be interpreted to be limited to the specific examples or embodiments or methods specifically disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

The invention has been described broadly and generically herein. Each of the narrower species and subgeneric groupings falling within the generic disclosure also form part of the invention.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. A process of forming expanded polystyrene beads having internal cells of a size typically generated by including a larger amount of pentane in the formulation, comprising:
  heating a mixture of styrene, demineralized water, brominated flame retardant chemicals, a peroxide first polymerization initiator, paraffin, tricalcium phosphate (TCP), a surfactant, an extender and D-limonene to a first polymerization temperature;
  adding 3-8% by weight pentane and a second polymerization initiator to the mixture and heating to a second polymerization temperature to form EPS beads having cells as large as if about 25% more pentane was used than the amount of pentane which actually was used.

2. The process of claim 1 wherein the brominated compounds are decabromodiphenyl oxide, phenoxy tetrabromnobisphenol A, or tetrabromobisphenol A bis(allyl ether), hexabromocyclododecane, and brominated polymer.

3. The process of claim 1 wherein the tricalcium phosphate (TCP) is in the form of fine particles.

4. The process of claim 1 wherein the extender is dodecylbenzenesulfonate or a persulfate salt.

5. The process of claim 4 wherein the persulfate salt is ammonium or potassium persulfate.

6. The process of claim 1 wherein the surfactant is a combination of a molecular colloid and an inorganic alkali metal salt.

7. The process of claim 6 wherein the molecular colloid is polyvinyl alcohol (PVA) or polyvinylpyrrolidone (PVP) and the inorganic alkali metal salt is $Mg_2P_2O_7$, $Ca_3(PO_4)_2$ or another alkali metal salt including salts of sulfates, chlorides, carbonates or hydrogencarbonates.

8. The process of claim 1 wherein the peroxide is dibenzoyl peroxide, hydrogen peroxide 2,5-dimethyl-2,5-di(2-ethylhexanoylperoxy)hexane, or hydrogen peroxide.

9. The process of claim 1 wherein the second polymerization initiator is tert-butyl perbenzoate, tert-butyl peroxy-2-ethylhexanoate, t-butyl ethylhexylmonoperoxycarbonate or t-amyl ethylhexylmonoperoxycarbonate.

10. The process of claim 1 further including melting the beads produced by the process of claim 1 inside a mold to form objects in the shape of the mold.

11. The process of claim 10 wherein the melting of the beads is with steam.

\* \* \* \* \*